(No Model.)
J. STORY.
PIPE COUPLING
No. 385,287. Patented June 26, 1888.
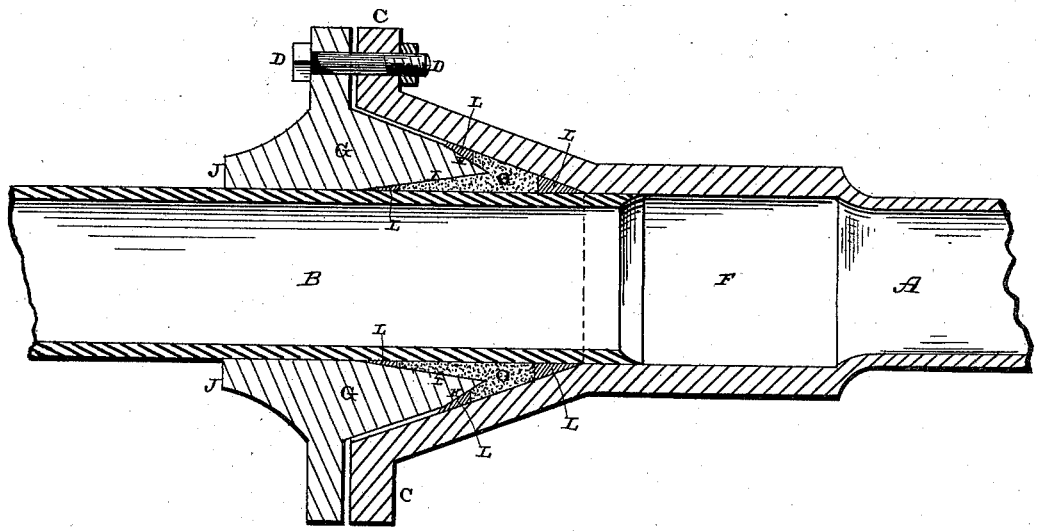

UNITED STATES PATENT OFFICE.

JOHN STORY, OF CASTLE SHANNON, PENNSYLVANIA.

PIPE-COUPLING.

SPECIFICATION forming part of Letters Patent No. 385,287, dated June 26, 1888.

Application filed June 13, 1887. Serial No. 241,147. (No model.)

*To all whom it may concern:*

Be it known that I, JOHN STORY, of Castle Shannon, in the county of Allegheny and State of Pennsylvania, have invented certain new and useful Improvements in Pipe-Couplings; and I do hereby declare the following to be a full, clear, and exact description of the invention, such as will enable others skilled in the art to which it pertains to make and use it, reference being had to the accompanying drawing, which forms part of this specification.

My invention relates to an improvement in pipe-couplings; and it consists in the combination of two pipes, one of which has a plain end and the other a tapering packing-socket, and a chamber beyond the packing-socket to receive the end of the adjoining pipe, to facilitate the connecting and disconnecting of single pieces of pipe when necessary without disturbing any of the other pieces in the line, a compressor which is made cone or wedge shape, so as to form, in combination with the two pipes, special wedge-shaped chambers, into which it forces the packing, and a collar which extends along one of the pipes as far as required and fits around the pipe which passes through it, as will be more fully described hereinafter.

The object of my invention is to use two wedge packings of cork or asbestus, which is applied at the extreme ends of the wedge packing-chambers at those points where the leakage is likely to occur, and to so construct a coupling that the packing material will be held permanently in position, and as the pipes contract and expand they will more tightly compress the wedge packing at those points where the leakage is likely to occur.

The accompanying drawing represents a vertical section of a coupling embodying my invention.

A represents one of the pipes, and B the other. The end of the pipe B is made perfectly plain, and it is inserted into pipe A sufficiently far so that it will extend beyond the funnel socket-chamber of pipe A. In this pipe A is formed a chamber, F, of any desired length, and which is made in diameter large enough to receive the end of pipe B. This chamber allows full scope for contraction and expansion of pipe B, while it is specially designed to facilitate the taking apart of single pieces when the line of pipes is all laid and connected, and to do this without injuring the coupling or disturbing any of the other pieces of pipe in the line.

The extreme end of the pipe A is made funnel-shaped, as shown, so as to form a wedge-shaped packing-chamber around the end of pipe B. Upon the extreme end of the tapering socket of pipe A is a flange, C, through which the clamping-bolts D are passed in the usual manner. The compressor G will preferably be made the shape here shown, and its inner end (its inner end will be understood to be the part from the flange which enters the packing-chamber of pipe A) is drawn or forced into the packing-chamber by the bolts D, for the purpose of compressing the packing into the wedge-shaped chambers, making a permanent and tight joint. The angle of the inner end of the compressor is made so as to correspond with the angle of the wall of the inside of the funnel-shaped socket-chamber.

To be best adapted for compressing the packing-wedges more effectually, the outer edge of the end of the compressor, as shown at H, is beveled away, so as to form a wedge-shaped packing-chamber between the wall of the funnel-chamber and the compressor. The apex of the cone or extreme point of the compressor being embodied in the packing material divides it, and allows the packing to be compressed on both sides of the compressor with a force nearly at right angles to its line of thrust. The inner side of the compressor is also beveled away, as shown at I, so as to form another wedge-shaped chamber between the compressor and the surface of pipe B, into which the packing-wedge is forced with a force nearly perpendicular to pipe B. Upon the outer end of the compressor is formed a collar, J, which fits around the pipe B and extends as far as required along pipe B, and, with the compressor, is made to slide easily back and forth along pipe B.

The object for which the collar is designed is to form a support for the pipe B, to take the strain off the extreme end of the pipe B and to distribute it along the pipe, but chiefly on the collar, so that, the pipe having two points of support and the strain being mostly on the collar outside of the packing-chamber, the coupling will remain rigid under the severe strains and shocks it may be subjected to and the packing-chambers remain intact and not be materially affected.

Instead of forming the whole body of the packing material of one single material, in the usual manner, I place in the extreme points of the packing-chamber a suitable quantity of either cork or asbestus, L, which is not only indestructible, but which can be compressed to such an extent as to make leakage impossible, no matter what the pressure in the pipes may be. In between these three bodies of cork or asbestus is placed a suitable body of packing material, O, which fills the larger part of the packing-chamber, and into which the extreme point of the compressor G is embodied. The packing being forced tightly into the wedge packing-chamber, as here shown, should there be any expansion of the pipe B, the frictional contact of the packing against the pipe B will cause the expansion of the pipe, to force the packing more tightly into the small end of the packing-chamber, and thus increase the tightness of the packing instead of loosening it at the only point at which the leakage can take place. In case the pipe B contracts, the frictional contact of the packing against the outer side of the pipe B causes the packing to be forced more tightly against the compressor G, and thus makes it impossible for leakage to take place either along the surface of the pipe B or the inner surface of the packing-chamber.

The qualities essentially necessary to make a perfect and permanent joint for pipes and tubes for conducting gas and fluid is a reserve of power to meet contingencies, and this quality must be combined in a coupling that will be free from leakage not only under common ordinary circumstances, but under any contingencies that may arise. The connection must not be injuriously affected by varying temperatures, and contraction and expansion must be freely provided for, and yet not impair the tightness of the connection. The connection for the pipes must be of such a character that the joints will remain rigid when subjected to such severe strains as sinking of the ground which supports the pipe and the shocks which they may receive from other causes. There must be a simple easy way to take out a single pipe from a line and replace it, when necessary, without detaching or disturbing any of the others in the line. Most of the connections now in use depend largely upon lead and india-rubber, gum, &c., for packing the joints, the lead being melted, poured around the joints, and then calked with a blunt chisel to take up the shrinkage. Whenever the pipe contracts, it displaces or pulls out the lead, and subsequent expansion leaves a hole. The rubber loses its elasticity, upon which the tightness of the joint entirely depends, and becomes useless. In couplings where the screws are relied upon contraction and expansion is not possible without damaging the coupling, and hence there are but few, if any, such joints that are tight.

The principle upon which I construct my coupling is of the wedge order, with the thin edge of the wedge nearest to the outlets, or, as we may term them, "leakage-points," and the wider end of the wedge nearest to the pressure of the gas. This pressure of the wide end of the wedge will tend to force the wedge forward, and hence make the joint tighter. It will be seen that the compressor and surface of the pipe B form an annular wedge-shaped chamber, of which the inner side of the compressor is the incline and the surface of the pipe B is the plane. The packing is the flexible or compressible wedge which fills the packing-chamber. The compressor in its inward movement has direct action in two different directions—one in the line of its thrust and the other and most important at nearly right angles to its line of thrust or perpendicular to surface of pipe B or plane of wedge. As the compressor is forced over the packing-wedge with a pressure perpendicular to the plane of pipe or plane of wedge, the compression increases toward the thin end of wedge, and with a force which is constant and permanent, being limited only by the strength of the materials.

The wedge order of the construction of my invention is calculated to use the most costly kind of packing—such as asbestus or cork—at the least expense. The indestructible article asbestus may be used at the thin ends of the wedge, a very small quantity being as efficient as if the whole chamber were filled with the more expensive material. Hence we get with the minimum of material the maximum of effect. As the angle included between the funnel-shaped socket and the surface of pipe inserted therein will be the same for a one-inch pipe-connection as for any larger pipe-connection, it follows that a circular wedge one-half inch long, if sufficient for a one-inch pipe-connection, will also be sufficient for any larger connection, as they will fill equal spaces (in length) of both, as the difference is in the diameter of the circle and not in the sectional area of the wedge. Of course it would be well, where danger by fire might be feared, to fill the whole connection with asbestus. Of course it is understood that these circular and annular wedges, if of cork, can be made in as many pieces as required, and may be only applied at those points where moisture and other agencies of a solvent character may be feared. The balance of the chamber will be filled with other cheaper and suitable packings.

Having thus described my invention, I claim—

The combination of a pipe provided with an integral flaring socket at one end and with a cylindrical chamber adjacent to said socket corresponding in internal diameter with the external diameter of the pipe to be joined, said flaring socket being provided with an exterior flange at its outer end, a pipe having a plain end of the same diameter as said cylindrical chamber, an annular compressor having a collar of a diameter to fit the plain-ended pipe and an exterior flange corresponding with the flange of said socket, the inwardly-projecting portion of said compressor being beveled on both its inner and outer faces, the bevel of the outer face corresponding with the flare of said socket for a certain distance from said collar, and being greater near the inner end of the compressor, packing within said socket surrounding said plain-ended pipe, and bolts passing through said flanges for compressing said packing, substantially as described.

In testimony whereof I affix my signature in presence of two witnesses.

JOHN STORY.

Witnesses:
W. H. GOULD,
R. N. FERGUS.